(12) United States Patent
Barsness et al.

(10) Patent No.: US 8,572,274 B2
(45) Date of Patent: Oct. 29, 2013

(54) ESTIMATING LOAD SHED DATA IN STREAMING DATABASE APPLICATIONS

(75) Inventors: Eric L. Barsness, Pine Island, MN (US);
John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/029,165

(22) Filed: Feb. 17, 2011

(65) Prior Publication Data

US 2012/0215934 A1 Aug. 23, 2012

(51) Int. Cl.
*G06F 15/16* (2006.01)
(52) U.S. Cl.
USPC .......................................................... 709/231
(58) Field of Classification Search
USPC .......................................................... 709/231
See application file for complete search history.

(56) References Cited

U.S. PATENT DOCUMENTS

| | | | |
|---|---|---|---|
| 2004/0139214 A1* | 7/2004 | Hinshaw et al. | 709/231 |
| 2006/0195599 A1 | 8/2006 | Gedik et al. | |
| 2009/0049187 A1* | 2/2009 | Gedik et al. | 709/231 |

OTHER PUBLICATIONS

Babcock, Brian et al., "Load Shedding for Aggregation Queries over Data Streams", Proceedings 20th International Conference on Data Engineering, 2004, Apr. 2, 2004, pp. 350-361.
Chi, Yun et al., "Loadstar: Load Shedding in Data Stream Mining", Proceeding VLDB 2005 Proceedings of the 31st International Conference on Very Large Data Bases, 2005, pp. 1302-1305.
Tatbul, Nesime et al., "Load Shedding in a Data Stream Manager", Proceeding VLDB 2003 Proceedings of the 29th International Conference on Very Large Data Bases, vol. 29, ACM, 2003.
Kitagawa, Hiroyuki et al., "Sensing Data Processing Infrastructure Technology—Stream Data Processing", Information Processing, Sep. 15, 2010, vol. 51, No. 9, pp. 1119-1126.
International Search Report and Written Opinion of the ISA dated Apr. 24, 2012—International Application No. PCT/IB2012/050329.

* cited by examiner

*Primary Examiner* — Benjamin R Bruckart
*Assistant Examiner* — Sibte Bukhari
(74) *Attorney, Agent, or Firm* — Patterson & Sheridan LLP

(57) ABSTRACT

Techniques are disclosed for processing data streams containing data tuples, where some of the data tuples are load shed. Load shedding refers to a process of selectively discarding some data tuples, e.g., when the amount of received data becomes too overwhelming to manage. When operations are invoked that depend on the values (or count) of the load shed tuples, the value (or counts) of the load shed tuples may be used to perform such operations. For example, an aggregation operation may return the sum, average, mean and/or variance associated with a plurality of tuples processed by a node of the stream application.

18 Claims, 6 Drawing Sheets

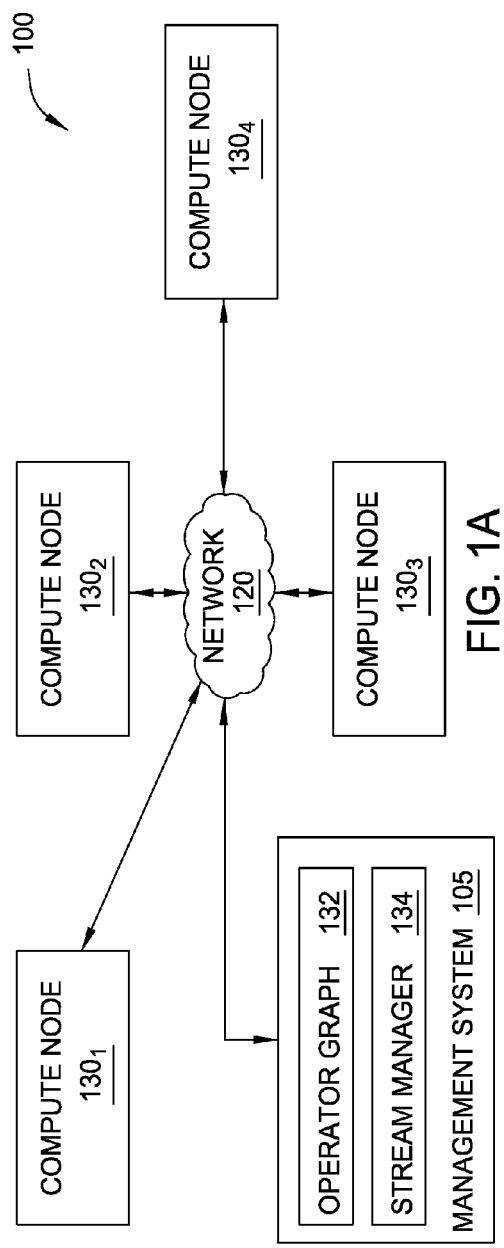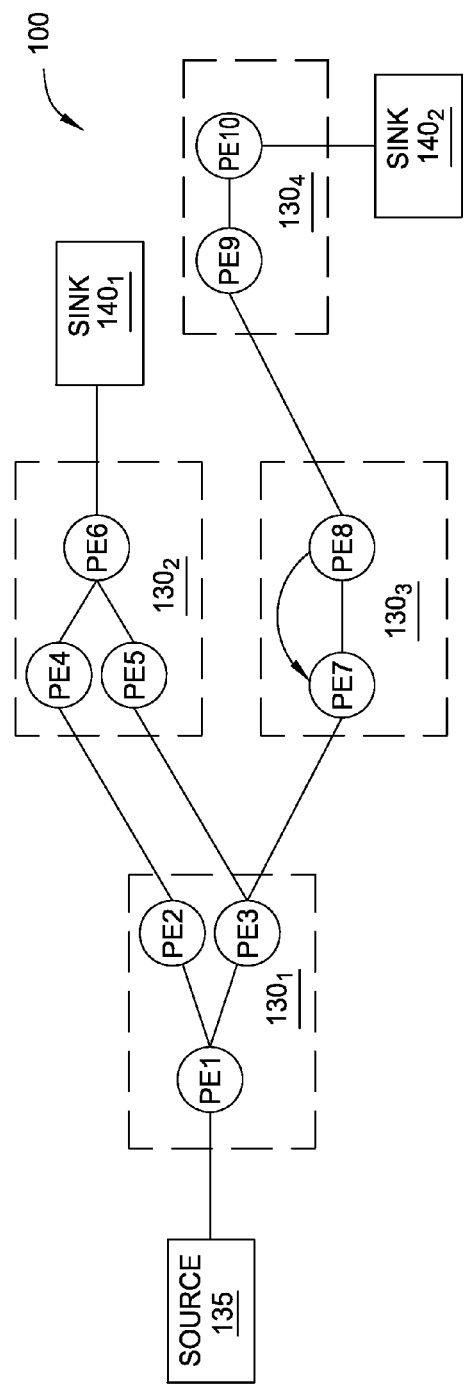

ESTIMATING LOAD SHED DATA IN STREAMING DATABASE APPLICATIONS

BACKGROUND

Embodiments of the invention are directed to data processing. In particular, embodiments of the invention are directed to data processing streams, where some of the data in the streams are load shed.

While computer databases have become extremely sophisticated, the computing demands placed on database systems have increased at a rapid pace. Database systems are typically configured to separate the process of storing data from accessing, manipulating or using data stored in the database. More specifically, databases use a model where data is first stored, then indexed, and then queried. However, this model cannot meet the performance requirements of some real-time applications. For example, the rate at which a database system can receive and store incoming data can limit how much data can be processed or otherwise evaluated, which, in turn, limits the utility of database applications configured to process large amounts of data in real-time.

To address this issue, stream based computing and stream based database computing is emerging as a developing technology for database systems. And products are available which allow users to create applications that process and query streaming data before it reaches a database file. With this emerging technology, users can specify processing logic to apply to inbound data records while they are "flight," with the results available in milliseconds. Constructing an application using this type of processing has opened up a new programming paradigm that will allow for a broad variety of innovative applications, systems and processes to be developed as well as present new challenges for application programmers and database developers.

A data stream may provide a continuous flow of data tuples from a source processing element to a destination processing element. In some cases, there are several processing elements that the data tuples pass through while traveling from the source to the destination.

In some cases, the data tuples are transmitted such that a bottleneck occurs in processing at one of the processing elements.

SUMMARY

One embodiment of the invention provides a method implemented in a stream-based computing system with load shedding. The method may receive a plurality of incoming tuples processed by a stream node of the stream-based computing system and process one or more of the received plurality of incoming tuples. Upon determining at least one condition for load shedding tuples has been satisfied, one or more tuples are discarded as they are received. This method may further include invoking an operation dependent, at least in part, on the one or more processed tuples and the discarded one or more tuples.

A computer-readable storage medium storing an application, which, when executed on a processor in a stream-based computing system with load shedding, performs an operation. The operation may generally include receiving a plurality of incoming tuples processed by a stream node of the stream-based computing system and processing one or more of the received plurality of incoming tuples. Upon determining at least one condition for load shedding tuples has been satisfied, one or more tuples are discarded as they are received. This operation may further include invoking an operation dependent, at least in part, on the one or more processed tuples and the discarded one or more tuples.

Still another embodiment of the invention provides a system having a processor and a memory storing an application program, which, when executed on the processor, performs an operation in a stream-based computing system with load shedding. The operation may generally include receiving a plurality of incoming tuples processed by a stream node of the stream-based computing system and processing one or more of the received plurality of incoming tuples. Upon determining at least one condition for load shedding tuples has been satisfied, one or more tuples are discarded as they are received. This operation may further include invoke an operation dependent, at least in part, on the one or more processed tuples and the discarded one or more tuples.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 1A-1B illustrate a computing infrastructure configured to execute a stream database application, according to an embodiment of the invention.

DETAILED DESCRIPTION

Figure 2:
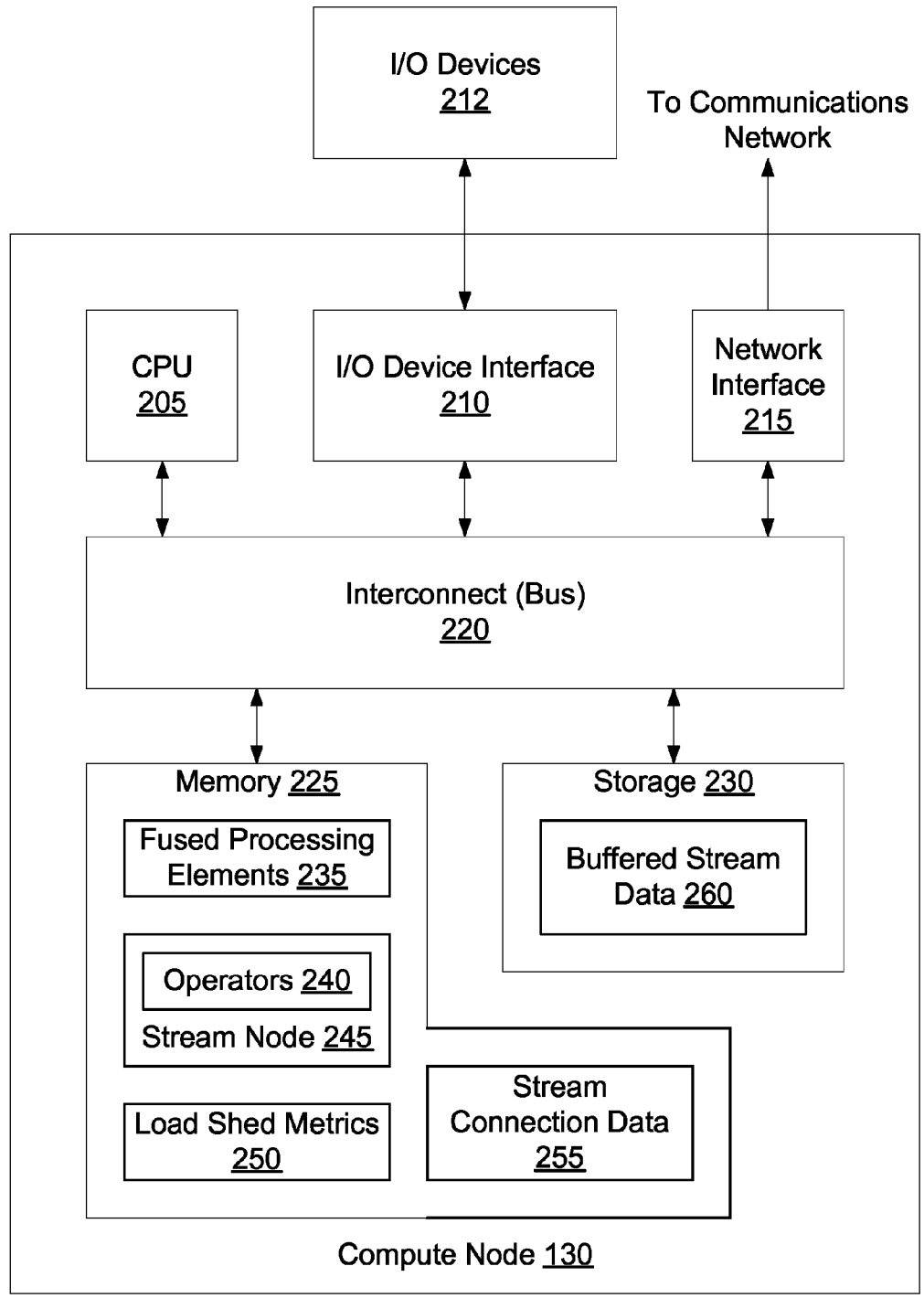
FIG. 2 illustrates a compute node, according to an embodiment of the invention.

Embodiments of the invention provide techniques for processing data streams containing data tuples, where some of the data tuples are load shed. Load shedding refers to a process of selectively discarding some data tuples, e.g., when the amount of received data becomes too overwhelming to manage. Various load shedding techniques are known in the art. For example, the round robin approach eliminates M out of every N incoming tuples. More complicated load shedding schemes attempt to estimate the importance of the incoming tuples and only process the most important ones.

The effects of the loss of data caused by load shedding are taken into account in processing and analyzing the data stream. For example, some stream operations or processing elements may require the values of tuples from the stream, including load shed tuples. Examples of such stream operations include aggregation, join, sort, and historic analysis. To process such stream operations, according to one embodiment, the values of the load shed tuples are estimated, and a range and a confidence interval for the estimate may be generated. The processor then executes the stream operation based on the known values of the processed tuples and the estimated values of the load shed tuples, including the range and the confidence interval.

Other stream operations, such as punctuation operations, insert additional data (or metadata) into the stream, and depend on the positions of load shed tuples for proper execution. To process these stream operations, an application program may estimate the positions of the load shed tuples. The application program then executes the punctuation operation based on the processed tuples and the estimated position of the load shed tuples.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIGS. 1A-1B illustrate a computing infrastructure 100 configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. The operator graph 132 represents a stream application beginning from of one or more source processing elements (PEs) through to one or more sink PEs. Data elements flow into a source PE of a stream application and are processed by that PE. Typically, processing elements receive an N-tuple of data elements from the stream as well as emit an N-tuple of data elements into the stream (except for a sink PE where the stream terminates). Of course, the N-tuple received by a processing element need not be the same N-tuple sent downstream. And the processing elements could be configured to receive or emit data in formats other than an N-tuple (e.g., the processing elements could exchange data marked up as XML documents). Additionally, each processing element may be configured to carry out any form of data processing functions on the received tuple, including, e.g., writing to database tables or performing other database operations such as data joins, splits, reads, etc., as well as performing other data analytic functions or operations.

The stream manager 134 may be configured to monitor a stream application running on the compute nodes $130_{1-4}$ as well as change the structure of the operator graph 132. For example, the stream manager 134 may move processing elements (PEs) from one compute node 130 to another, e.g., to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$.

FIG. 1B illustrates an example operator graph that includes ten processing elements (labeled as PE1-PE10) running on the compute nodes $130_{1-4}$. While a processing element may be executed as an independently running process (with its own process ID (PID) and memory space), multiple processing elements may be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at a source PE 135 (labeled as PE1) and ends at sink PEs $140_{1-2}$ (labeled as PE6 and PE10). Compute node $130_1$ includes source PE1 along with PE2 and PE3. Source PE1 emits tuples received by PE2 and PE3. For example, PE1 may split data elements received in a tuple and pass some data elements to PE2 others to PE3. Data that flows to PE2 results in tuples emitted to PE4 on compute node $130_2$. And data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which emits tuples processed by sink PE10 $140_2$.

FIG. 2 is a more detailed view of the compute node 130 of FIGS. 1A-1B, according to one embodiment of the invention. As shown, the compute node 130 includes, without limitation, a central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In this example, the memory 225 includes a fused processing element (PE) 235, a stream node 245, load shed metrics 250, The stream node 245 (or the PEs on stream node 245) may be configured to begin load shedding when an operator is unable to keep up with the amount of incoming data. In such a case, load shed metrics may provide thresholds set for operators such as X amount of tuples within a given time frame or X amount of tuples within a given time frame relative to how many tuples are sent to other operators. As another example, the stream node 245 may observe the incoming data tuples and shed the data tuples based on the data itself, e.g., the load shed metrics 250 may specify certain attributes having certain values or a value within a range etc. The load shedding might also be time dependent where the stream node 245 processes tuples received during a time interval and then sheds tuples coming in after that. As yet another example, the stream node 245 might load shed data tuples when an incoming tuple does not provides a new value. That is, in some cases, the operator may have seen a tuple having the same (or similar) information before in a process configured to search for changes to tuple values (e.g., changes that exceed a certain magnitude specified by the load shed metrics 250). The stream node 245 includes a collection of operators 240. Each operator 240 may provide a small chunk of executable code configured to process data flowing into a processing element (e.g., PE 235) and to emit data to other operators 240 in that PE and to other PEs in the stream application. Such PEs may be on the same compute node 130 or on other compute nodes accessed over the data communications network 120. The stream connection data 255 represents the connections between PEs on compute node 130 (e.g., a TCP/IP socket connection), as well as connections to other compute nodes 130 with upstream and or downstream PEs in the stream application, also via TCP/IP sockets (or other inter-process data communication mechanisms).

Buffered stream data 260 represents a storage space for data flowing into the compute node 105 from upstream processing elements (or from a data source for the stream application). For example, buffered stream data may include data tuples waiting to be processed by a processing element, such as PE 235. Buffered stream data 260 may also store the results of data processing performed by PE 235 that will be sent to downstream processing elements (or load shed at downstream processing elements).

Figure 3:
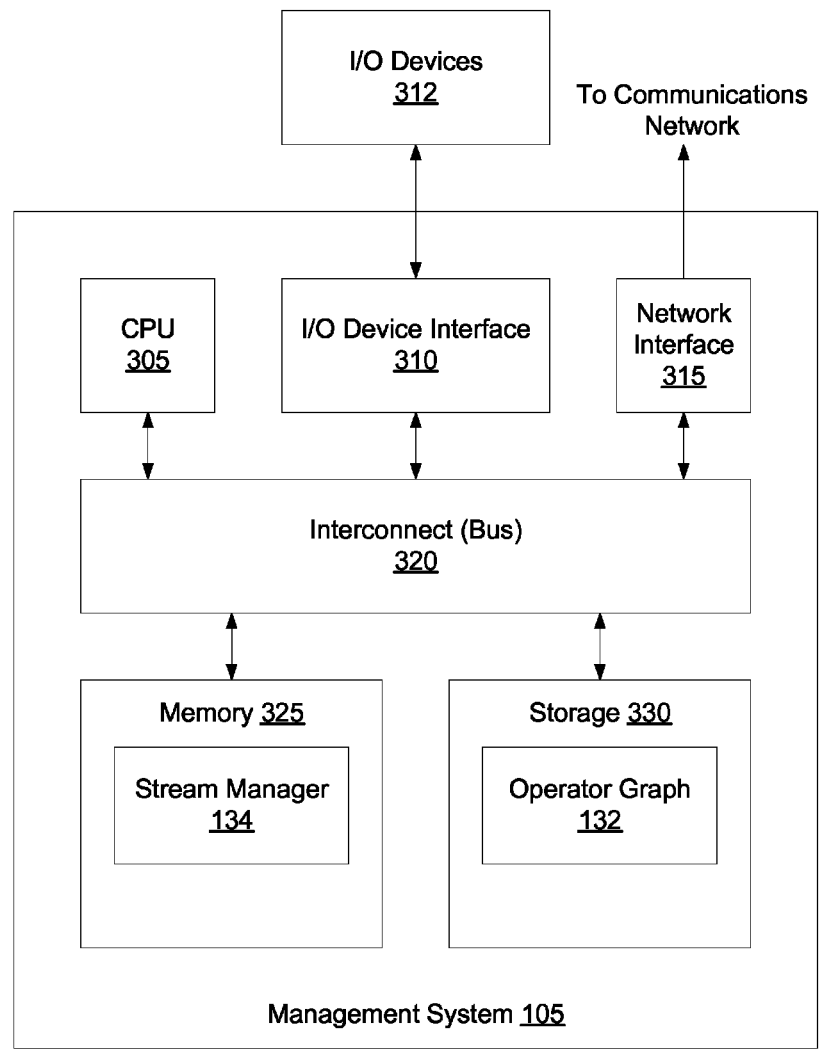
FIG. 3 illustrates a management system, according to an embodiment of the invention.

FIG. 3 is a more detailed view of the management system 105 of FIG. 1, according to one embodiment of the invention. As shown, management system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display, and mouse devices) to the management system 105.

CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. The storage 330 includes an operator graph 132. The operator graph 132 represents a stream application beginning from of one or more source processing elements (PEs) through to one or more sink PEs. In one embodiment, the stream manager 134 monitors a stream application running on the compute nodes $130_{1-4}$ and changes the structure of the operator graph 132 as needed. For example, the stream manager 134 may move processing elements (PEs) from one compute node 130 to another, e.g., to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$.

In addition, the stream manager 134 may be configured to select a load shedding scheme and to determine which data to load shed, and at which processing elements load shedding takes place. Load shedding may take place at the source PE 135, at the sink PE 140, or at any other processing element. In one embodiment, a round robin load shedding scheme of load shedding M out of every N tuples is used. In another embodiment, a more complicated load shedding technique estimates the importance of an incoming tuple and load shed the less important tuples.

Alternatively, each node processing tuples may determine which tuples to load shed while processing an incoming stream of data tuples and emitting an outgoing stream of data tuples. For example, a given node may determine to load shed tuples when the incoming rate exceeds the processing capacity at that node. Of course, the stream manager 134 could be used to configure the parameters for load shedding on individual processing nodes according to a variety of conditions.

Figure 4:
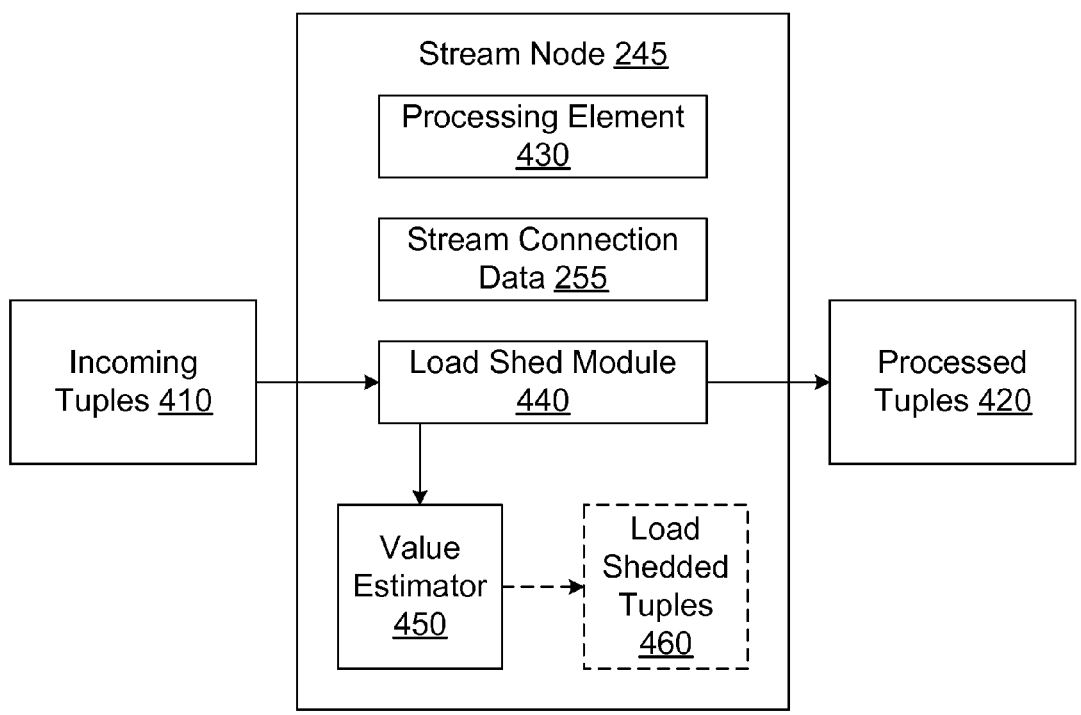
FIG. 4 illustrates a stream node, according to an embodiment of the invention.

FIG. 4 illustrates a stream node 245, according to an embodiment. As shown, the stream node includes a processing element 430, such as processing elements PE1-PE10 of FIG. 1B, which is configured to process tuples from a data stream. Stream node 245 generally is configured to receive data (tuples) from the stream for processing by processing element 430.

The stream node 245 also includes a load shed module 440. The load shed model may be configured to execute the load shedding operation. The load shed module 440 receives incoming tuples 410 from the data stream. For each incoming tuple 410, the load shed module 440 determines whether to process the incoming tuple or to load shed the incoming tuple. If a given tuple is not load shed by the load shed module 440, then the processing element 430 carries out the particular processing activity of stream node 245 and output as processed tuples 420. Processed tuples 420 are provided as the output of the load stream node 245. That is, stream node 245 is configured to emit tuples passed downstream to other stream nodes of the stream application. For each load shed tuple 460, the load shed module 440 may use value estimator 450 to estimate and output the value of the load shed tuple. In addition to the estimated value, the value estimator 450 may also provides a range and confidence interval for the value for the estimates of the load shed tuples and maintain a count of how many tuples have been load shed by the stream node 245. As explained in more detail below, these ranges and confidence intervals are useful when the processing element 430 invokes an operation that requires the value of load shed tuples.

As noted, the processing element 430 of the stream node 245 may perform a variety of different operations with one (or more) incoming data tuples. For example, an aggregation operator may be used to aggregate data from multiple tuples over a given windowing condition. In one embodiment, the windowing condition is time based, but the windowing condition may also be tuple based (i.e., based on a count of tuples). When there is no load shedding, a count and a measure of the value of incoming tuples 410 is produced. After a given amount of time passes or a given number of tuples is processed, a result for the windowing operation is obtained. For example, the sum of the values of all the tuples or the mean value of the tuples can be calculated.

Load shedding tuples complicates aggregation operations (and other operations) as a value for tuples that have been load shed should need to be represented in the aggregation operation in order to return a meaningful result. That is, the load shed tuples 460 should not be ignored when an aggregation (or similar operation) is performed. Accordingly, in one embodiment, the stream node is configured to estimate or otherwise predict the values of the tuples that have been load shed. If needed, the processing node may also maintain a count (or create an estimate) of a number of such tuples. In addition to the aggregation operation, this approach can be used for other operations that require data within a windowing condition, such as join and sort operations. A join is when two streams are joined by a given operator. The join in a streaming concept looks at the window of information being held by the join operator and joins the streams according to the join condition. Hence when tuples are shed some join(s) of data will not exist because the data is not within the window. In such a case, the value estimator 450 may try and predict what tuples would have been joined. Likewise, the sort operator sorts whatever tuples are present in its window of data and the value estimator 450 may try to predict values for load shed tuples. Doing so may be used in cases where a position with in a sorted order matters (e.g., the top ten data tuples observed during the window).

Thus, in cases where an aggregation operation is to occur based on the amount of tuples coming into the operator, a property of the operator may be set to include the amount of tuples being ignored (as best as can be estimated). If an actual count of load shed tuples is unavailable, a predictive analysis may be performed to estimate a number of tuples that would have been processed had no tuples been load shed and instead made their way to the operator. This type of analysis may be used by any operator that is window capable, i.e. join operators, sort operators and the like.

A variety of other processing operations may be disrupted by load shedding tuples. That is, in some cases a user may not want to ignore load shedding when other aspects of the streaming environment are evaluated. For example, a processing element may maintain a built-in history. The history provides an indication of what tuples arrive to a given operator for processing. The processing element at a given stream node may need to make use of comparisons of historical data sent to the operator when processing a current tuple (or tuples). In such a case, the processing element may be configured to take into account how much data would have reached the operator if no load shedding had occurred—or estimate historical values for load shed tuples as needed.

Still another example includes taking account of load shed tuples (or estimates thereof) or estimates of tuple values (e.g., aggregation operations) in aspects of the stream application that balance and distribute workloads. For example, as noted, the stream manager may be configured to duplicate a processing element within a stream application. Shedding data tuples will skew data and obscure memory estimates and processor requirements when trying to be predictive in placement of jobs(s) and operators. Accordingly, in one embodiment, the load shed module 440 may provide counts (or estimates) of load shed tuples to the stream manager to allow this information to be used in managing the broader stream application.

Figure 5:
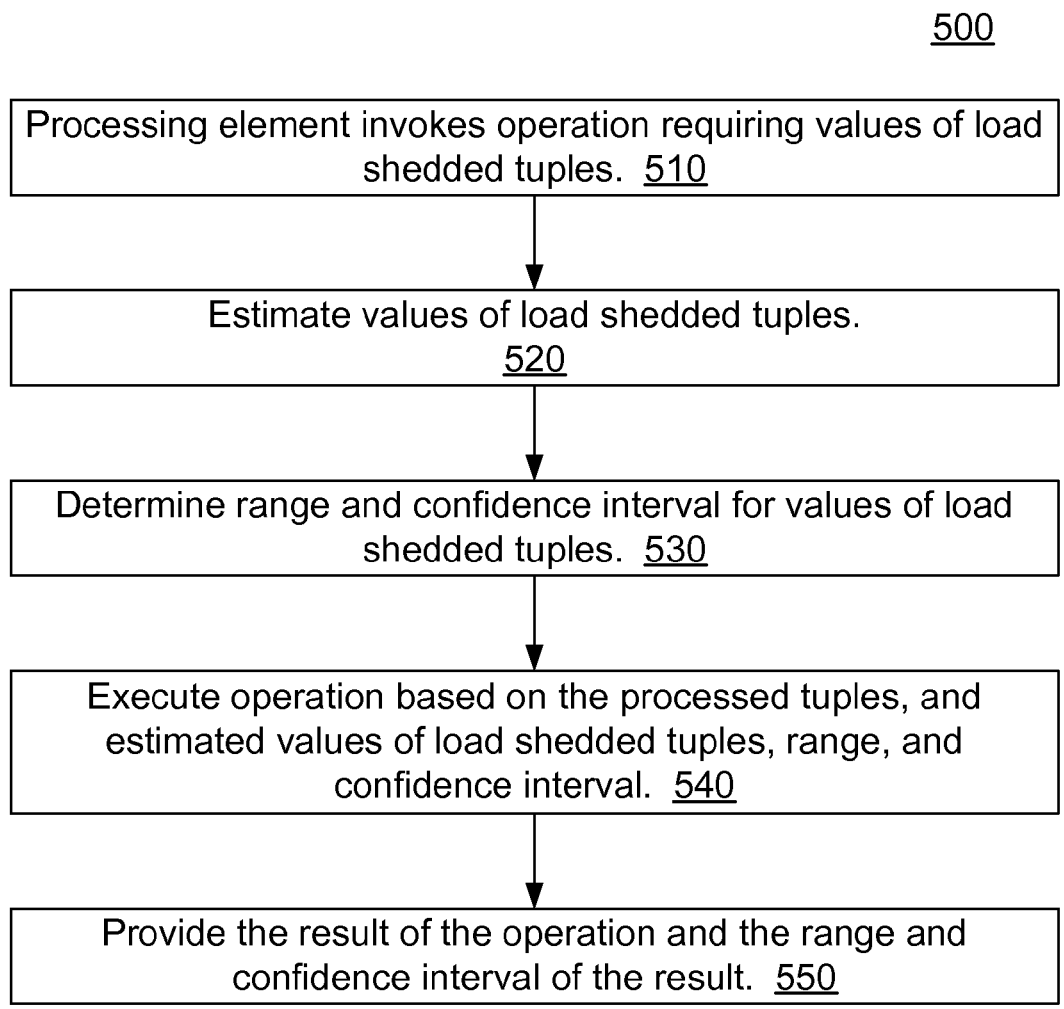
FIG. 5 illustrates method of invoking an operation requiring values of load shed tuples, according to an embodiment of the invention.

FIG. 5 is a flowchart of a method 500 of invoking an operation 240 requiring values of load shed tuples 460, according to an embodiment of the invention. In step 510, a processing element 430 invokes an operation 240 requiring values of load shed tuples 460. The operation 240 could be an aggregation operation, a join operation, a sort operation, or any other operation requiring data tuples received at the stream node 245.

In step 520, the value estimator 450 estimates the values of the load shed tuples 460. In one embodiment, the estimated value is an average value for the load shed tuples. For example, an average may be determined from the tuples actually processed by the stream node. In such a case, the value estimator may multiply the average value by the number of load shed tuples (or an estimate of a count of such tuples). Further, the average may be varied using a random element to provide a mathematical distribution, such as a normal distribution (e.g., based on the variance and standard deviation of the values of the processed tuples). In either case, in step 530, the value estimator 450 provides a range and confidence interval for the values of the load shed tuples. The concepts of range and confidence interval, and various techniques for calculating these values, are well known in the field of statistics and are not described here. As one skilled in the art would recognize, the value estimator includes both a module for estimating the value of the load shed tuples and a module for providing a range and confidence interval for the estimated value of the load shed tuples.

In step 540, the processing element 430 executes the operation 240 based on the processed tuples 420 and the estimated values of the load shed tuples 460, and the range and confidence intervals of the values of the load shed tuples. The result of the operation 240 is also provided with a range and confidence interval. This result is provided as the output of the operation 240 in step 550.

It should be noted that, in one embodiment, statistical methods are employed to estimate the accuracy of the predictions of values in the load shed tuples 460. These values would have been known with complete accuracy had load shedding not been in effect. Therefore, it is a feature of one embodiment that estimates of values, having a mean and standard deviation, replace values that would have been exact but for the load shedding.

For some operations 240, the history of incoming tuples 410 passed through a given stream node 245 is relevant. For example, a "punctuation" operation may depend on the order in which tuples are received. More specifically, punctuation operations add metadata or other information at specific points within a data stream. For example, a punctuation operation may be inserted following every $1000^{th}$ tuple. Such an operation could be a trigger to notify a developer or administrator each time the node has processed 1000 tuples or could specify a debugging breakpoint. Load shedding is problematic in these cases because no record is left of incoming tuples 410 that are load shed 460 and not processed. Therefore, in one embodiment, the processing element 430 can adjust the historical tuples involved in an operation 240 by taking into account how many tuples would have reached the processing element 430 had load shedding not occurred.

Figure 6:
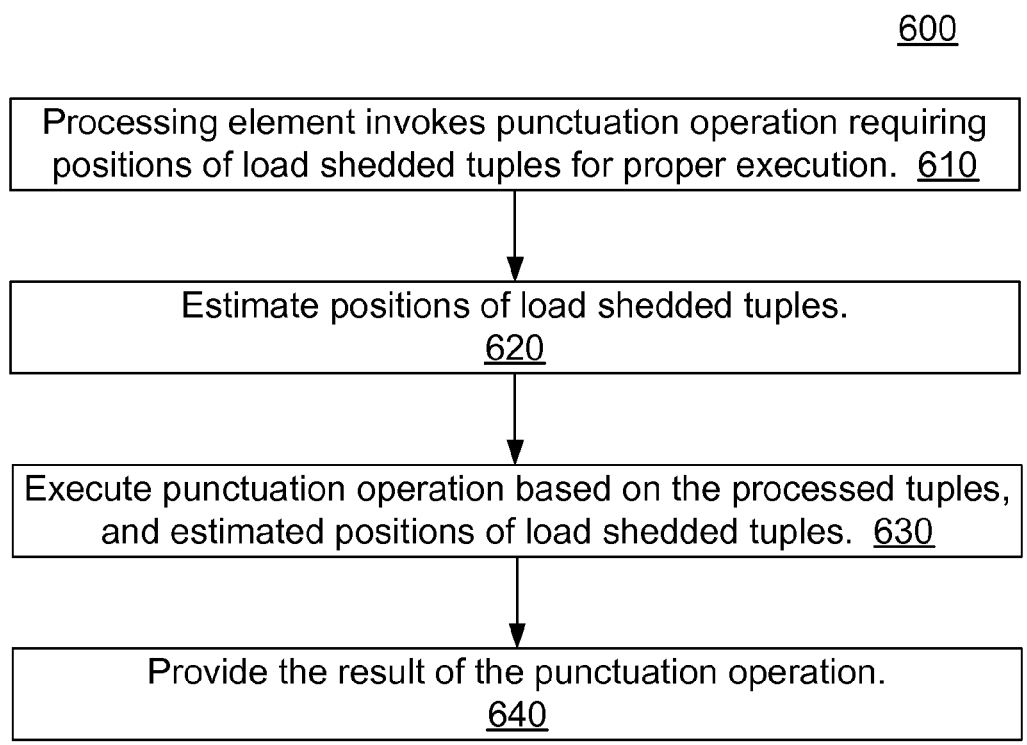
FIG. 6 is a flowchart of a method of invoking a punctuation operation requiring the positions of load shed tuples, according to an embodiment of the invention.

FIG. 6 is a flowchart of a method 600 of invoking a punctuation operation requiring the positions of load shed tuples 460, according to an embodiment. In step 610, the processing element 430 invokes the punctuation operation. As noted, the punctuation operation depends on the order (or number) of tuples received by the stream node. For example, the punctuation operation may be configured to insert data (or metadata) after X tuples are processed. In step 620, the value estimator 450 estimates the number of load shed tuples 460. Thus, the punctuation operator inserts punctuation into a stream of tuples. The punctuation is then used in downstream processing to provide some sort of logical break in the data. This logical break can be used in many ways. It can be used by the programmer to trigger an event of any kind. The punctuation as a logical break can be used for the programmer's purpose. The punctuation operator may rely on a windowing feature such that after so many tuples, punctuation can be added to the stream. If the system load sheds a large number of tuples, the punctuation may be inserted at points in the data stream based on estimates of the load shedding that occurred.

In step 630, the processing element 430 inserts the relevant punctuation (tuple data or metadata) based on the processed tuples 420 and the estimated load shedding activity. The processing element 430 provides the result of the punctuation operation in step 640.

It should be noted that, in regards to the historical values, statistical and predictive methods are used to estimate the number (or relative positions) of the load shed tuples 460. These positions would have been known with complete accuracy had load shedding not been in effect. Therefore, it is a feature of one embodiment that estimates of positions, having less than complete accuracy, are used to replace values that would have been known but for load shedding.

While the foregoing is directed to embodiments of the present invention, other and further embodiments of the invention may be devised without departing from the basic scope thereof, and the scope thereof is determined by the claims that follow.

What is claimed is:

1. A computer-readable memory storing an application, which, when executed on a processor in a stream-based computing system with load shedding, performs an operation, comprising:

receiving streaming data to be processed by a first operator within a first processing element of the stream-based computing system;

processing, at the first operator, a plurality of tuples of the streaming data;

upon determining at least one workload condition for load shedding tuples has been satisfied, discarding two or more tuples of the streaming data as they are received and before being processed at the first operator;

for each of the two or more discarded tuples, generating one or more respective estimated values, based on the two or more discarded tuples and the plurality of processed tuples, wherein the one or more estimated values approximate output values for the two or more discarded tuples had the two or more discarded tuples been processed at the first operator; and transmitting the estimated values to a downstream operator in the stream-based computing system, wherein the downstream operator is a punctuation operation, comprising, determining an ordinal position for at least one of the processed tuples, relative to other tuples of the plurality of incoming tuples processed;

determining an ordinal position for at least one of the discarded tuples relative to other tuples of the plurality of incoming tuples processed;

returning the determined ordinal positions as the result of the punctuation operation; and inserting punctuation data into the data stream for use by the downstream operator based on the determined ordinal positions.

2. The computer-readable memory of claim 1, further comprising, causing a window condition to complete on a downstream operator and the downstream operator to emit results.

3. The computer-readable memory of claim 1, wherein the estimated values for the one or more discarded tuples comprises one of an average, mean, or variance value determined from the estimated values.

4. The computer-readable memory of claim 1, wherein the operation further comprises, determining at least one of a range for the estimated values and a confidence measure for the estimated values.

5. The computer-readable memory of claim 1, wherein the estimated values provide a count of the one or more discarded tuples.

6. The computer-readable memory of claim 1, wherein the operation further comprises, storing a count of discarded tuples.

7. A system, comprising:

a processor; and a memory storing an application program, which, when executed on the processor, performs an operation in a stream-based computing system with load shedding, the operation comprising:

receiving streaming data to be processed by a first operator within a first processing element of the stream-based computing system;

processing, at the first operator, a plurality of tuples of the streaming data;

upon determining at least one workload condition for load shedding tuples has been satisfied, discarding two or more tuples of the streaming data as they are received and before being processed at the first operator;

for each of the two or more discarded tuples, generating one or more respective estimated values, based on the two or more discarded tuples and the plurality of processed tuples, wherein the one or more estimated values approximate output values for the two or more discarded tuples if processed at the first operator; and transmitting the estimated values to a downstream operator in the stream-based computing system, wherein the downstream operator is a punctuation operation, comprising, determining an ordinal position for at least one of the processed tuples, relative to other tuples of the plurality of incoming tuples processed;

determining an ordinal position for at least one of the discarded tuples relative to other tuples of the plurality of incoming tuples processed;

returning the determined ordinal positions as the result of the punctuation operation; and inserting punctuation data into the data stream for use by the downstream operator based on the determined ordinal positions.

8. The system of claim 7, further comprising, causing a window condition to complete on a downstream operator and the downstream operator to emit results.

9. The system of claim 7, wherein the estimated values for the one or more discarded tuples comprise one of an average, mean, or variance value determined from the estimated values.

10. The system of claim 7, wherein the operation further comprises, determining at least one of a range for the estimated values and a confidence measure for the estimated values.

11. The system of claim 7, wherein the estimated values provide a count of the one or more discarded tuples.

12. The system of claim 7, wherein the operation further comprises, storing a count of discarded tuples.

13. A system, comprising:
a processor; and
a memory storing an application program, which, when executed on the processor, performs a punctuation operation in a stream-based computing system with load shedding, the punctuation operation comprising:
receiving streaming data comprising processed tuples and discarded tuples;
determining an ordinal position for at least one of the processed tuples, relative to other tuples of the processed tuples;
determining an ordinal position for at least one of the discarded tuples relative to other tuples of the processed tuples; and
inserting punctuation data into the data stream for use by a downstream operator based on the determined ordinal positions,
wherein two or more tuples of the streaming data are discarded before being processed at a first operator and a plurality of tuples are processed at the first operator, and wherein one or more respective estimated values correspond to each of the two or more discarded tuples, and wherein the estimated values are received at the downstream operator.

14. The system of claim 13, wherein the punctuation operation further comprises invoking an operation to cause a window condition to complete on a downstream operator and the downstream operator to emit results.

15. The system of claim 13, wherein the estimated values for the two or more discarded tuples comprise one of an average, mean, or variance value determined from the estimated values.

16. The system of claim 13, wherein the punctuation operation further comprises determining at least one of a range for the estimated values and a confidence measure for the estimated values.

17. The system of claim 13, wherein the punctuation operation further comprises estimating a count of the one or more discarded tuples.

18. The system of claim 13, wherein the punctuation operation further comprises:
generating the one or more estimated values corresponding to each of the two or more discarded tuples; and
transmitting the estimated values to a downstream operator in the stream-based computing system.

* * * * *